United States Patent
Champaigne et al.

(10) Patent No.: US 12,466,029 B2
(45) Date of Patent: Nov. 11, 2025

(54) FAST ACQUISITION CONTROL SYSTEM FOR SHOT PEENING VALVES

(71) Applicant: Electronics Inc., Mishawaka, IN (US)

(72) Inventors: Jack M. Champaigne, Mishawaka, IN (US); Mark A. Ingram, Granger, IN (US); Bryan Chevrie, South Bend, IN (US)

(73) Assignee: Electronics Inc., Mishawaka, IN (US)

( * ) Notice: Subject to any disclaimer, the term of this patent is extended or adjusted under 35 U.S.C. 154(b) by 458 days.

(21) Appl. No.: 17/978,784

(22) Filed: Nov. 1, 2022

(65) Prior Publication Data

US 2023/0158638 A1    May 25, 2023

Related U.S. Application Data

(60) Provisional application No. 63/274,285, filed on Nov. 1, 2021.

(51) Int. Cl.
  *B24C 5/08*     (2006.01)
  *B24C 7/00*     (2006.01)
  *F16K 31/08*    (2006.01)

(52) U.S. Cl.
  CPC .................. *B24C 5/08* (2013.01); *B24C 7/00* (2013.01); *F16K 31/082* (2013.01)

(58) Field of Classification Search
  CPC .......... B24C 5/08; B24C 7/00; B24C 7/0046; B24C 7/0053; B24C 1/10; F16K 31/082
  USPC ............................................... 451/38, 39, 93
  See application file for complete search history.

(56) References Cited

U.S. PATENT DOCUMENTS

| | | | |
|---|---|---|---|
| 3,141,982 A | 7/1964 | Smith | |
| 4,805,429 A | 2/1989 | Thompson | |
| 4,873,855 A * | 10/1989 | Thompson | B24C 1/10 |
| | | | 451/39 |
| 5,176,018 A * | 1/1993 | Thompson | G01P 11/00 |
| | | | 73/861.71 |

(Continued)

FOREIGN PATENT DOCUMENTS

| | | |
|---|---|---|
| CN | 110446985 A | 11/2019 |
| WO | WO-2019051616 A1 * | 3/2019 |

OTHER PUBLICATIONS

Electronics Inc. Instruction Manual, 600 Series Ferrous MagnaValve® 610-24NF (Non-Ferrous) MagnaValve® for Air-Blast Machines, Oct. 2021, 86 pp.

(Continued)

*Primary Examiner* — Brian D Keller
*Assistant Examiner* — Marcel T Dion
(74) *Attorney, Agent, or Firm* — Greenberg Traurig, LLP

(57) ABSTRACT

A method for regulating the flow of media that provides a valve having a first pole piece and a second pole piece that are separated by a working gap through which media may flow. The pole pieces direct a first magnetic field through the working gap. A coil generates a second magnetic field when electrical current is passed through the coil and that second magnetic field is capable of opposing the first magnetic field. The current in the coil is set at a first level that corresponds to a desired low rate of media through the working gap. The actual flow rate that results from the first duty cycle of current in the coil is compared to a desired flow rate and the current can be adjusted if the actual flow rate is different than the desired flow rate.

8 Claims, 11 Drawing Sheets

(56) References Cited

U.S. PATENT DOCUMENTS

| | | | |
|---|---|---|---|
| 5,223,778 A | 6/1993 | Svarovsky et al. | |
| 5,460,025 A | 10/1995 | Champaigne | |
| 5,654,496 A * | 8/1997 | Thompson | B24C 5/04 |
| | | | 73/1.01 |
| 7,499,239 B2 | 3/2009 | Chang | |
| 10,882,159 B2 | 1/2021 | Cheng et al. | |
| 11,052,925 B2 | 7/2021 | Gotou et al. | |
| 2002/0131349 A1 | 9/2002 | Watt et al. | |
| 2014/0235140 A1* | 8/2014 | Maurer | B26F 3/004 |
| | | | 451/75 |
| 2015/0160144 A1 | 6/2015 | Goldfine et al. | |
| 2018/0264625 A1* | 9/2018 | Schneidau | B24C 7/0053 |
| 2019/0308300 A1* | 10/2019 | Teraoka | B24C 1/083 |
| 2019/0337121 A1* | 11/2019 | Cheng | B24C 7/0069 |
| 2020/0061775 A1* | 2/2020 | Sohn López-Forment | |
| | | | B24C 7/0038 |
| 2020/0269388 A1* | 8/2020 | Champaigne | B24B 39/006 |
| 2020/0400469 A1* | 12/2020 | Champaigne | F16K 31/082 |

OTHER PUBLICATIONS

MagnaValves for Wheel Blast Machines, Retrieved from internet: https://www.electronics-inc.com/product-category/magnavalves/wheel-blast-machines/?filter_control=flow-rate, accessed Jun. 29, 2022, 2 pp.

* cited by examiner

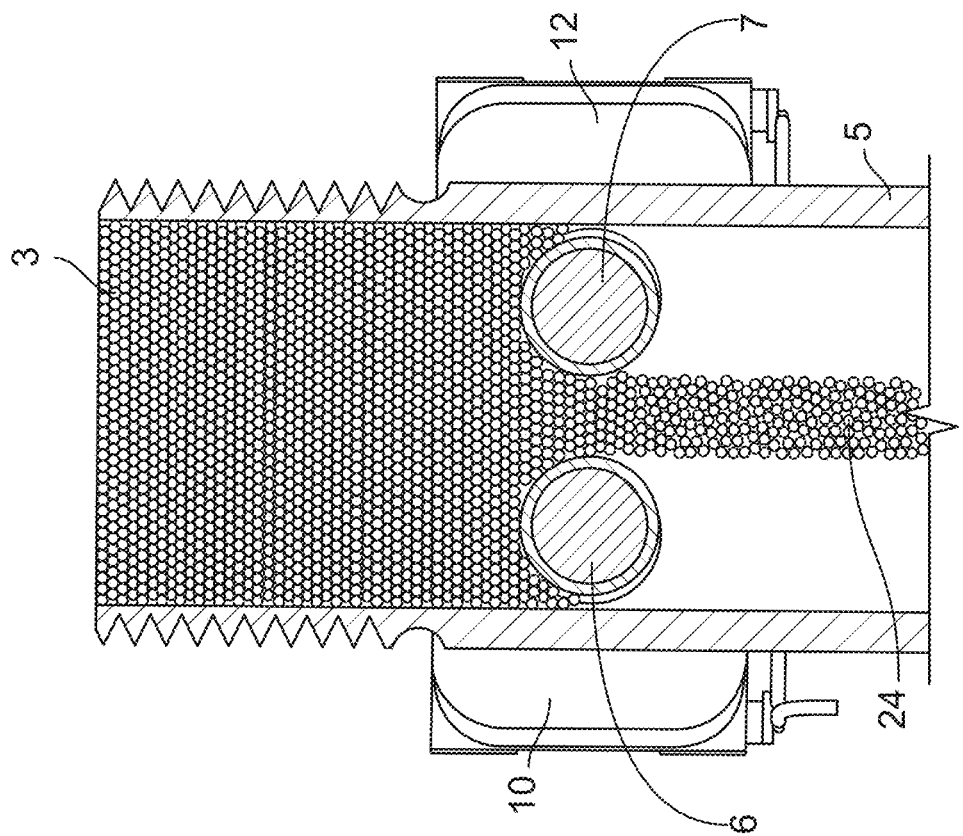
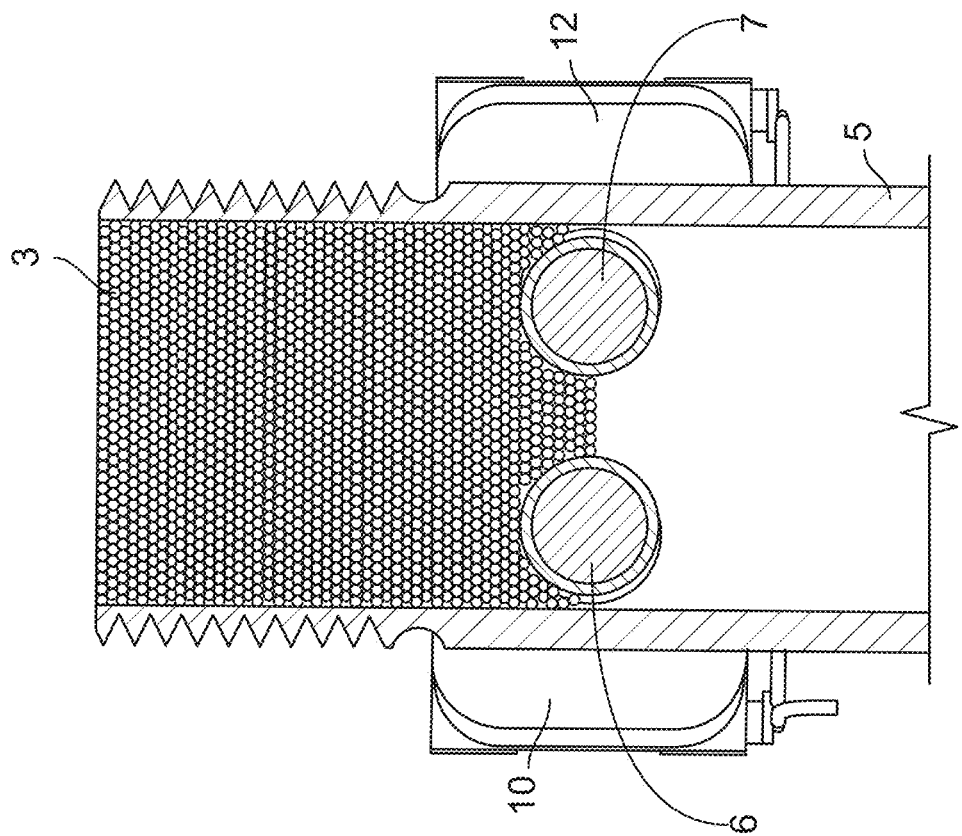

though the first valve 1 and the second valve 2 are two slightly different configurations, both valves 1, 2 function in a nearly identical manner. The valves 1, 2 are used to control media 3 that is to be dispensed into a stream of fluid (most commonly air) that drives the media 3 into a surface to be treated by shot peening. The valves 1, 2 have a pipe 5 that receives and guides the flow of media 3. In some embodiments, the valves 1, 2 may be above another intersecting pipe (not shown) that contains the stream of air that drives the media 3 into a workpiece.

FAST ACQUISITION CONTROL SYSTEM FOR SHOT PEENING VALVES

CROSS-REFERENCE TO RELATED APPLICATION

This application is a non-provisional conversion of U.S. Patent Application No. 63/274,285 entitled "FAST ACQUISITION CONTROL SYSTEM FOR VALVES," filed Nov. 1, 2021, which is herein incorporated in its entirety and for all purposes.

TECHNICAL FIELD

This disclosure generally relates to shot peening, and, specifically, a fast acquisition control system for shot peening valves.

BACKGROUND

Shot peening is a surface enhancement process that imparts a compressive residual stress into the surface of a metal component by impacting metallic, ceramic, or glass peening particles at high velocity.

BRIEF DESCRIPTION OF THE DRAWINGS

FIG. 7 shows the valve in FIGS. 5 and 6 in an off condition according to the various examples disclosed herein.

FIG. 8 shows the shows the valve of FIG. 7 in an on condition according to the various examples disclosed herein.

DETAILED DESCRIPTION OF INVENTION

Figure 1:
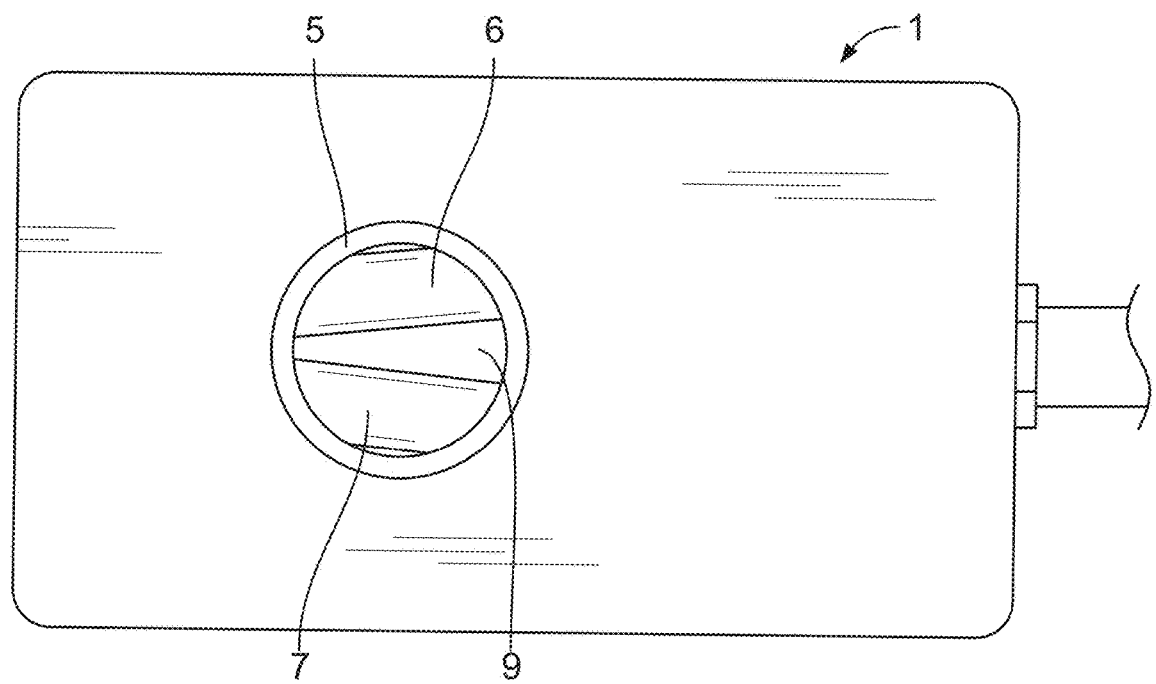
FIG. 1 shows a valve in a housing according to the various examples disclosed herein.
Figure 2:
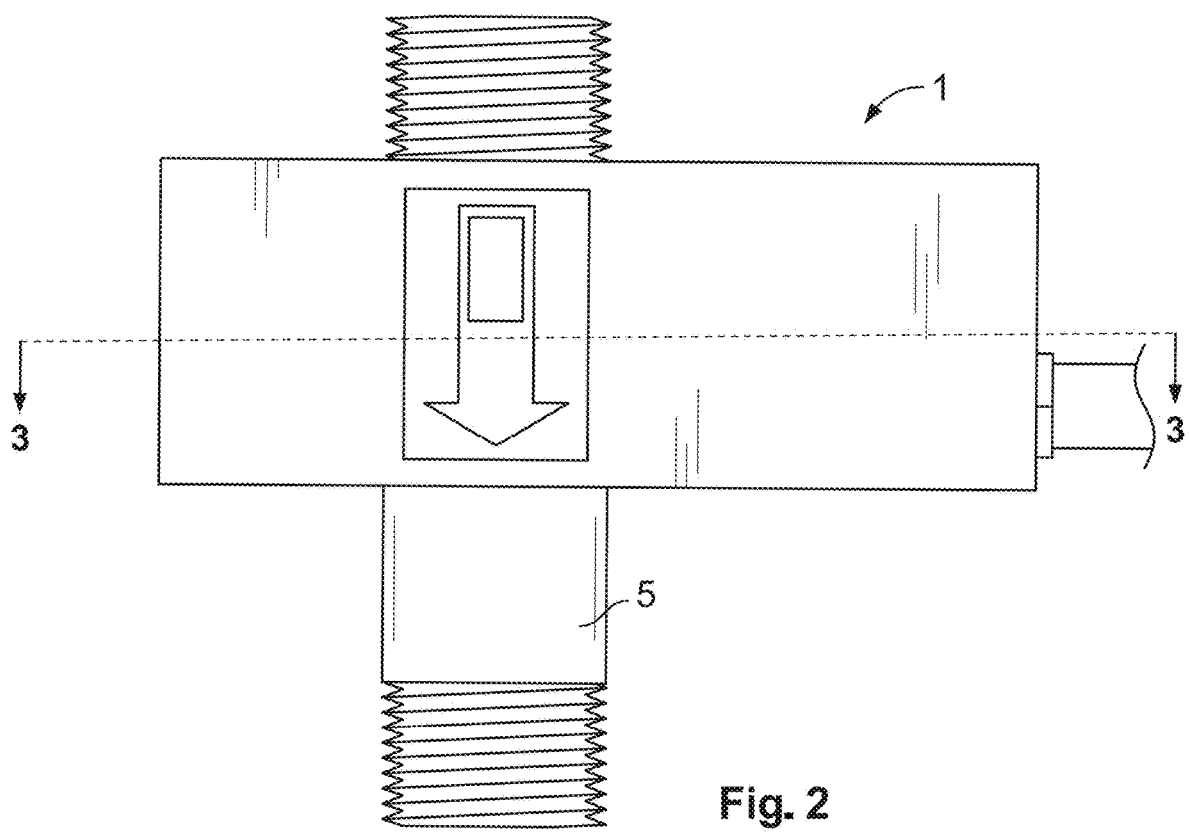
FIG. 2 is a side view of the valve of FIG. 1 according to the various examples disclosed herein.

Getting a desired flow rate quickly established in a shot peening process is important. Traditionally, shot peening valves may take a significant amount of time to achieve their desired flow rate because those valves may take time to ramp up to a desired flow rate. Such valves may start their parameters for initiating flow of media at a level that is not well correlated to parameters that are actually necessary to achieve a particular flow rate. As such, when a valve is started with parameters that are not particularly near those that will achieve a desired flow rate, additional time will be spent to ramp up to that desired flow rate. In addition to the time consumed by starting with parameters that may not be close to what is necessary to achieve a particular flow rate, there will also be time taken to establish a stable flow that comes from reaching a steady state condition. It may therefore be desirable to have a valve that begins its flow rate with parameters at or near what is necessary to achieve a desired flow rate, then actual flow rate resulting from those parameters can be measured. If the desired flow rate is not reached by applying a first set of parameters, then an appropriate adjustment may be made so that the desired flow rate is achieved more quickly with less iterations than otherwise may be used with prior methods where initial parameters of the valve are far from a desired flow rate. It may further be desirable to have a valve that may automatically correct its input parameters for changing conditions that may affect flow rate so that the desired flow rate may be maintained in spite of changing conditions that might otherwise alter the flow rate.

FIGS. 1-11 show first and second magnetic flow valves 1, 2 (collectively "valves 1, 2") that are used to control ferrous media 3. Although the first valve 1 and the second valve 2 are two slightly different configurations, both valves 1, 2 function in a nearly identical manner. The valves 1, 2 are used to control media 3 that is to be dispensed into a stream of fluid (most commonly air) that drives the media 3 into a surface to be treated by shot peening. The valves 1, 2 have a pipe 5 that receives and guides the flow of media 3. In some embodiments, the valves 1, 2 may be above another intersecting pipe (not shown) that contains the stream of air that drives the media 3 into a workpiece.

Figure 3:
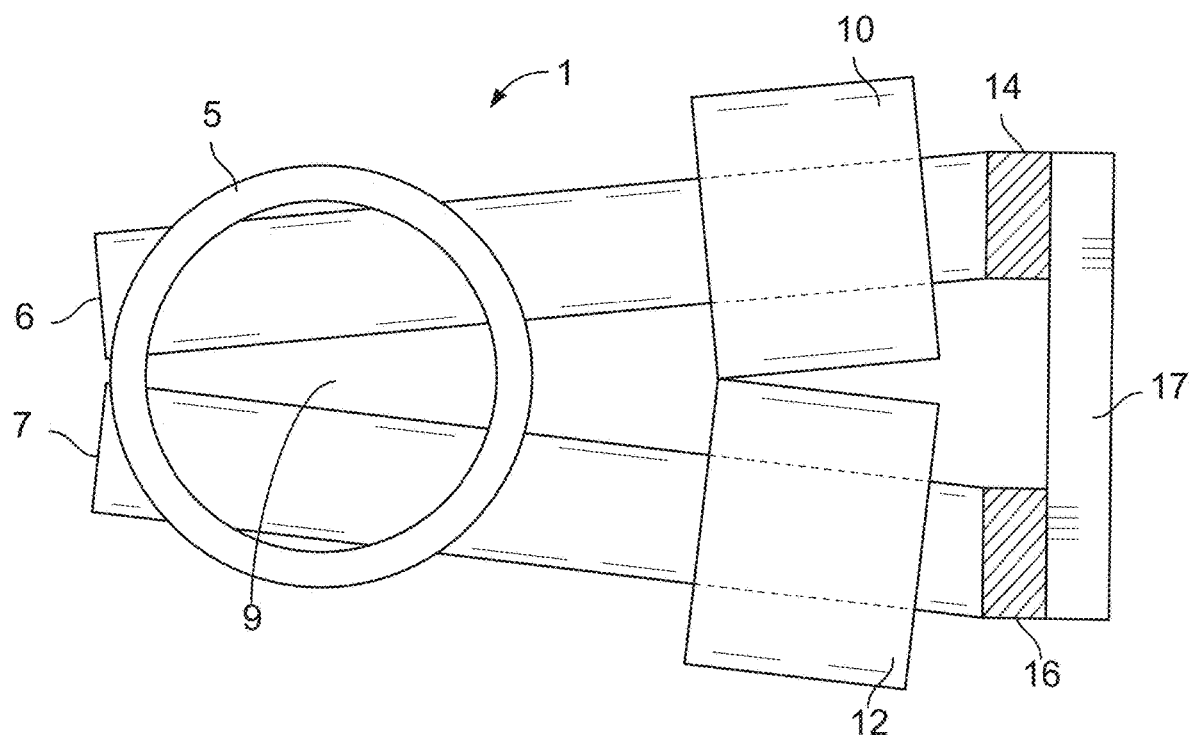
FIG. 3 shows pole pieces within the valve as viewed from line 3-3 in FIG. 2 according to the various examples disclosed herein.

The first valve 1, as shown in FIG. 3, has pole pieces 6, 7 that are made of a magnetic material. The pole pieces 6, 7 are spaced from each other at their portions that extend transversely through pipe 5. In various embodiments, magnetically "soft" material may be used to form the pole pieces 6, 7 to prevent undesired residual magnetism that may impact proper valve flow characteristics. In various embodiments, the pole pieces 6, 7 may be composed of another magnetically conductive material. FIG. 3 shows the arrangement of the pole pieces 6, 7 as they extend into the pipe 5. The space between the pole pieces 6, 7 is a working gap 9 through which media 3 can flow.

Figure 4:
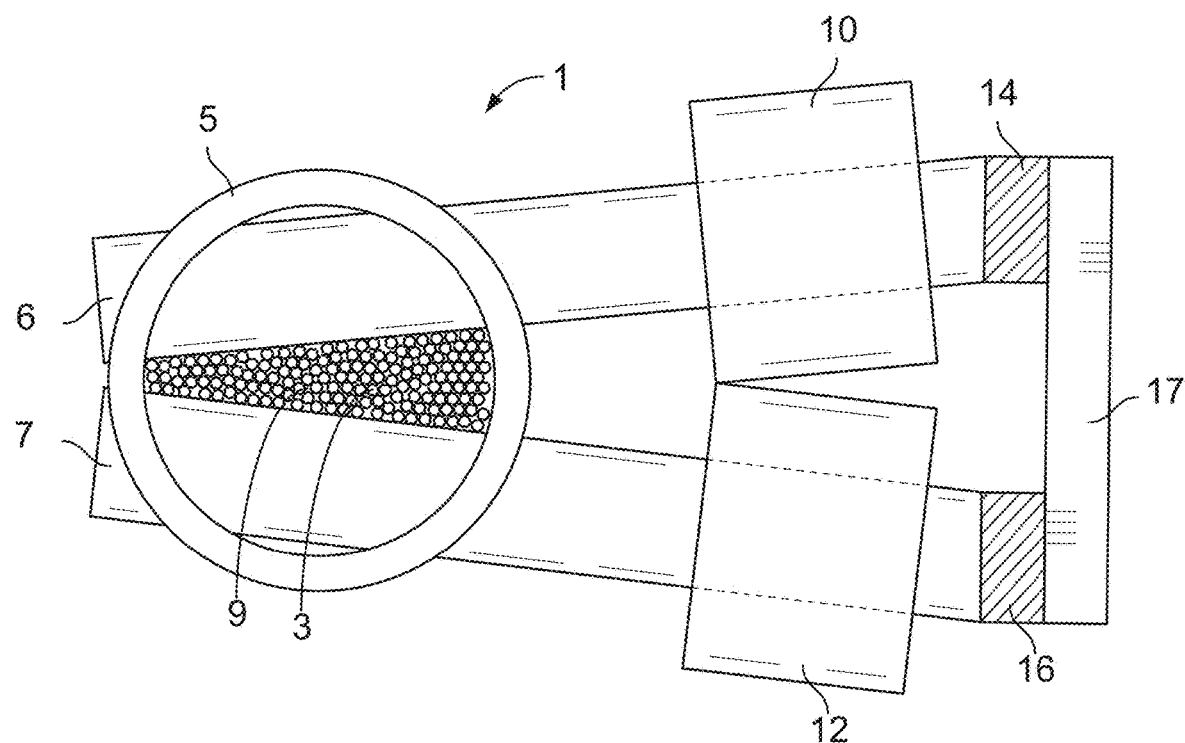
FIG. 4 shows the valve in FIG. 3 with media in a working gap of the valve according to the various examples disclosed herein.
Figure 5:
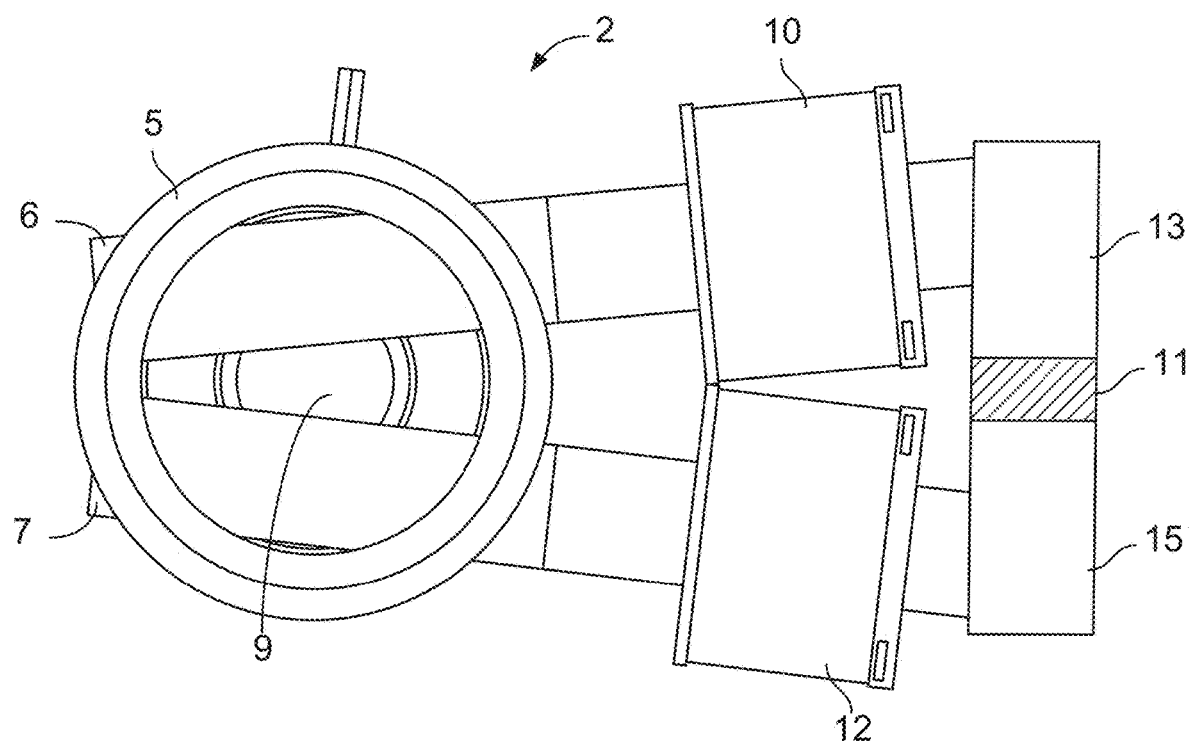
FIG. 5 shows a valve having a single permanent magnet according to the various examples disclosed herein.
Figure 6:
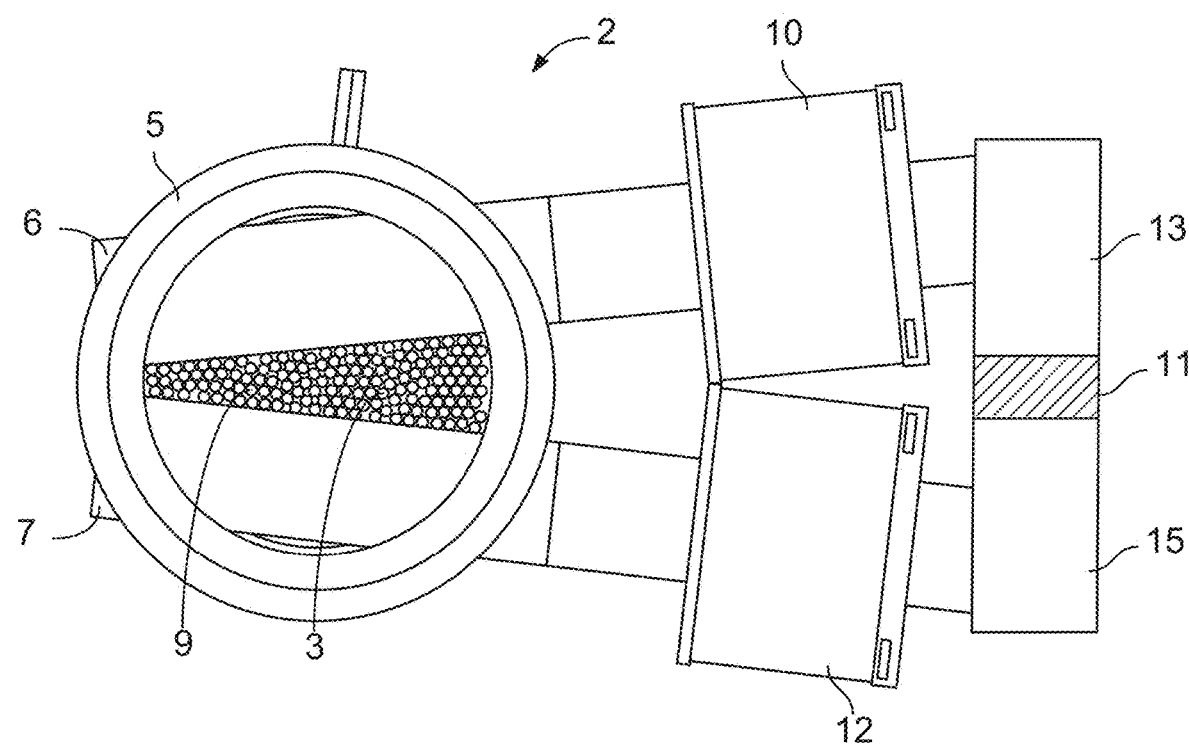
FIG. 6 shows the valve in FIG. 5 with media in its working gap according to the various examples disclosed herein.
Figure 9:
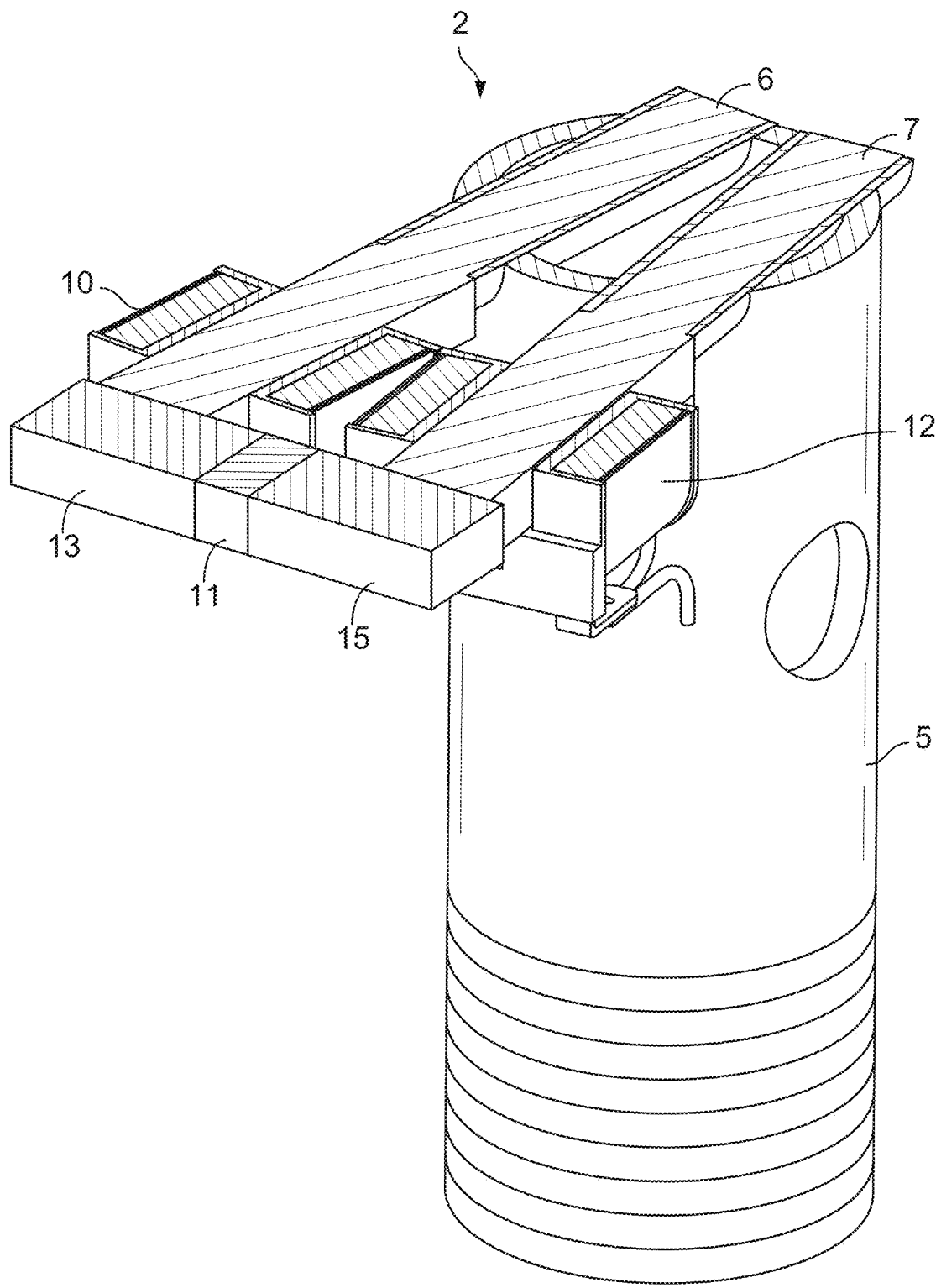
FIG. 9 is a sectional view of the valve shown in FIGS. 5-8 according to the various examples disclosed herein.
Figure 10:
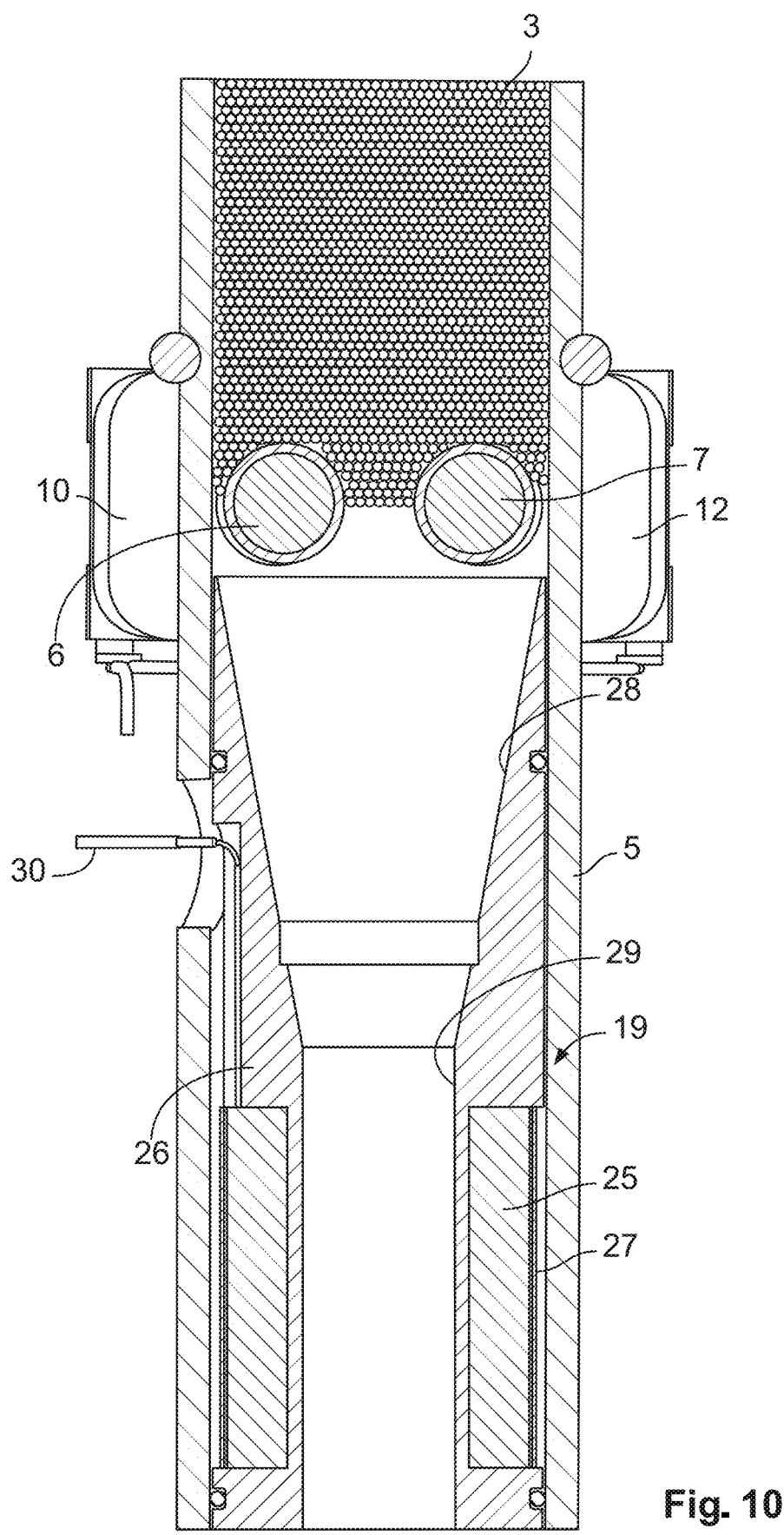
FIG. 10 is a sectional view of a valve in an off condition according to the various examples disclosed herein.

Each pole piece 6, 7 is shown with a corresponding coil 10, 12 that may generate a magnetic field when electric current is passed through the coils 10, 12. Alternatively, the first valve 1 may be equipped with one coil, or a multitude on each pole piece, to achieve the required magnetic field strength. The ends of the pole pieces 6, 7 that are external to the pipe 5 have permanent magnets 14, 16 attached to corresponding pole pieces 6, 7. The permanent magnets 14, 16 are connected with a shunt 17. The shunt 17, and pole pieces 6, 7, are magnetically conductive and form a continuous path for magnetic flux. When the first valve 1 is in its off condition (e.g., no electrical current is passed through the coils 10, 12), the magnetic field travels from the magnets 14, 16, through the shunt 17 and through pole pieces 6, 7. This directs the magnetic flux into the working gap 9. In the "off" condition, no electric current is present in the coils 10, 12 and the magnetic field from the permanent magnets 14, 16 is at its full strength through the working gap 9. That magnetic field from the permanent magnets 14, 16 is considered a first magnetic field and has a first direction. With no electric current in the coils 10, 12, the first magnetic field from the permanent magnets 14, 16 is at its full strength in the working gap 9. In this condition, ferrous or magnetically-conductive media 3 that enters the working gap 9 is trapped by the first magnetic field in the absence of current in the coils 10, 12. This is shown in FIGS. 4 and 6.

The second valve differs from the first valve 1 in that the second valve 2 uses a single permanent magnet 11 to generate a first magnetic field. The permanent magnet in the second valve 2 is located between two spacer blocks 13, 15 that are magnetically conductive. The spacer blocks 13, 15 conduct magnetic flux into the pole pieces 6, 7. As such, the magnetic flux is conducted into the working gap 9. FIG. 6 shows the off condition of the second valve 2.

Figure 11:
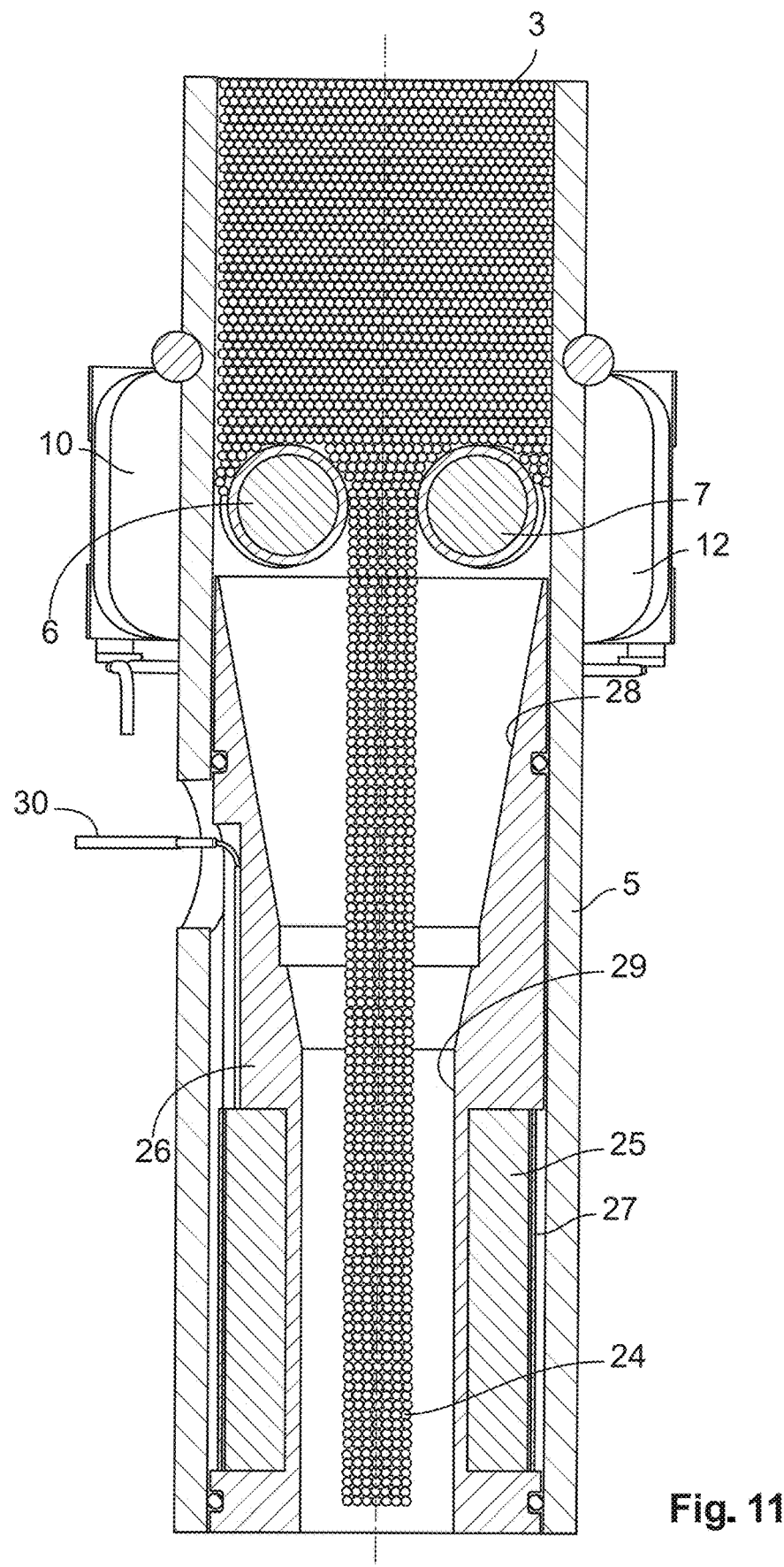
FIG. 11 is the view of the valve in FIG. 10 in an on condition according to the various examples disclosed herein.

In an "on" condition of the valves 1, 2, the first magnetic field from the permanent magnets 14, 16 or 11 is at least partially blocked by an opposing field, generated by the coils 10, 12. The coils 10, 12 generate a second magnetic field. The second magnetic field from the coils 10, 12 is in the opposite direction as the first magnetic field from the permanent magnets 14, 16 or 11. Blocking the first magnetic field allows media 3 to flow. It should be noted that after the application of electric current in the coils 10, 12, some time is required for the flow of media 3 to stabilize. The term "stabilize" should be taken to mean that the media 3 has reached a sensor 19 below the pole pieces 6, 7 and is flowing at its steady state value given the parameters that govern its flow. FIGS. 8 and 11 show media 3 flowing through the second valve 2 in the "on" condition in response to electric current in the coils 10, 12. Although angled pole pieces 6, 7 extending through pipe 5 are shown, it is possible to have other configurations of pole pieces that have different geometry (e.g., a single pole piece or any number of pole pieces extending through pipe 5).

Figure 12:
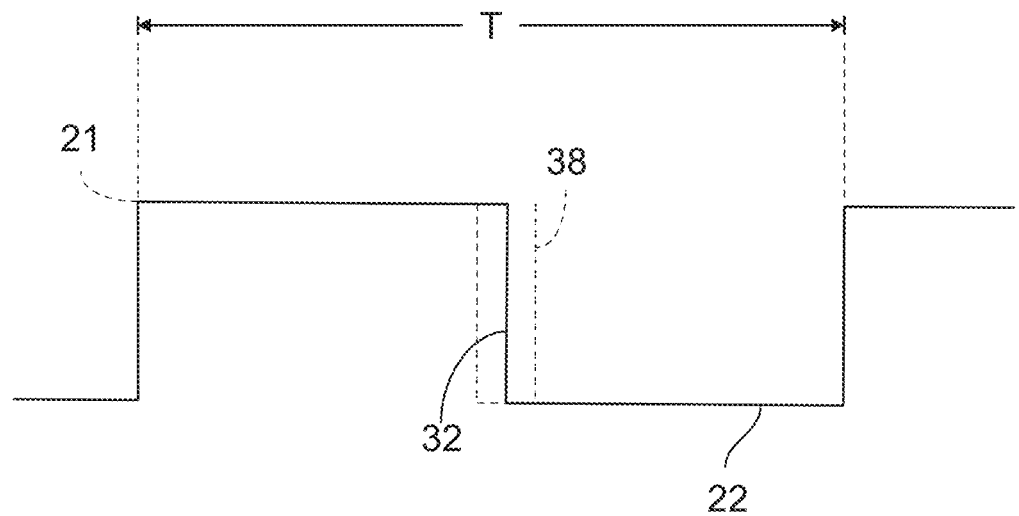
FIG. 12 is a time diagram of a pulse of electrical current supplied to coils in a valve according to the various examples disclosed herein.

In various embodiments, the coils 10, 12 surround their corresponding pole pieces 6, 7. Increasing or decreasing current through coils 10, 12, allows proportional control of media flow. One method of applying electric current through the coils 10, 12 is with a servo mode of control, in which pulses of electrical current are sent. These pulses may be defined by pulse width or by a duty cycle. An example duty cycle is shown in FIG. 12. The waveform shown in FIG. 12 shows the off state of current at 22 and the amplitude of current as measured in Amperes at 21. In this case, the duty cycle is shown at approximately 50% of the period T. Changing the duty cycle of the pulses of current as shown in FIG. 12 changes the duration of time that power flows through coils 10, 12 and therefore, can change the flow rate. Changing the duty cycle changes the time the coils 10, 12 generate a magnetic field to oppose the permanent magnets 14, 16, or 11. Longer duty cycles generally correspond to higher flow rates, and shorter duty cycles generally correspond to lower flow rates.

Figure 16:
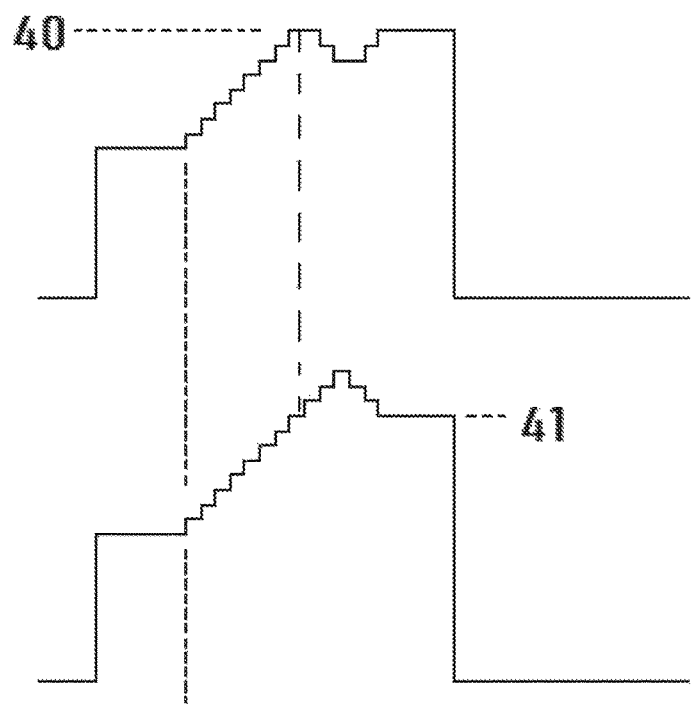
FIG. 16 is a time diagram of neutral field current (NFC) supplied by a coil in a valve according to the various examples disclosed herein.

Using electrical current in the coils 10, 12 blocks part or all of the magnetic field from the permanent magnets 14, 16, or 11. Referring to FIG. 12, the magnetic field from permanent magnets 14, 16, or 11 is at least partially blocked when the current is applied to the coils 10, 12 at the amplitude 21. Reducing the effective magnetic field of the permanent magnets 14, 16, or 11 to a zero or near zero value in the working gap 9, allows the media 3 to pass minimally obstructed through the working gap 9. The amount of current that achieves a zero (or near zero) magnetic field in the working gap 9 (measured in Tesla or Gauss) is referred to as Neutral Field Current ("NFC"). During application of NFC, typically media may flow freely without hinderance providing a maximum flow rate for the valves 1, 2. NFC is set by applying an electric current through the coils 10, 12 at 1% duty cycle (this corresponds to a DC current) and noting the amplitude of the current supplied that yields no magnetic flux in the working gap. This traditionally requires a gauss probe to be inserted into the working gap. However, the NFC may also be set using an Automatic Neutral Field Adjustment (ANFA) process. This ANFA process first attempts to stimulate flow at a 1% mass flow rate, measured by a downstream flow rate sensor. If the flow rate measured does not match the 1% mass flow rate, the NFC is adjusted in steps until the flow rate begins to decrease, as seen in FIG. 16. This peak is the Maximum Sensor Signal 40. Once this Maximum Sensor Signal is located, the Proper NFC setting 41 is measured. The program then completes a test at the Proper NFC setting 41 to confirm that the desired mass flow rate has been achieved.

It is also possible to supply more electrical current in the coils 10, 12 than necessary to block the permanent magnets 14, 16, or 11. In this case the current may exceed the amplitude necessary to achieve NFC. This oversupply of current to the coils 10, 12 results in a magnetic field in the working gap 9 in the opposite direction of the permanent magnets 14, 16, or 11. This is because at all times the magnetic field in the coils 10, 12 may be opposite to that of the permanent magnets 14, 16, or 11 and when current above NFC is supplied, the magnetic field of the coils 10, 12 overtakes the magnetic field of the permanent magnets 14, 16, or 11. Oversupplying current in the coils 10, 12 to an amplitude 21 that is above NFC is referred to as overdriving the coils 10, 12. In the case of less than 1% duty cycle and an amplitude 21 that overdrives the coils 10, 12, the magnetic field in the working gap 9 intermittently reverses.

In some applications NFC may not necessarily correspond to the maximum flow rate and that may be due in part to the type of media used for a particular application or the condition of the media. For instance, fine particle media made from ferrous metal or partially magnetized media may not flow freely because these media tend to build up or clump together in the working gap 9. A way to maximize the flow of such difficult flowing media is to overdrive the coils 10, 12. The amount of overdriving must be carefully chosen to substantially maximize the flow rate when using the difficult flowing media. Setting the flow rate may be done by beginning with a 1% duty cycle current then varying the amplitude 21 until flow rate as measured corresponds to a maximum value for that particular valve.

Setting the amplitude for overdriving to achieve maximum flow rate may additionally or alternatively be done by beginning with a duty cycle less than 1% and holding that duty cycle while varying the amplitude to achieve a measured maximum flow rate of media. In such embodiments, the duty cycle may be held constant and the amplitude may be varied to determine what amplitude of current is needed to overdrive to a level that maximizes flow of media through the valve. Beginning with a duty cycle less than 1% and varying the amplitude to achieve a measured maximum flow rate is particularly useful when using fine particle media because the reversal of the magnetic field in the working gap 9 dislodges media that would otherwise clump together. When overdriving the coils 10, 12 as described above, this allows reversal of the magnetic field in the working gap 9 without reversing the magnetic field in the coils 10, 12 and without reversing the polarity of current in the coils 10, 12. The magnetic field in the coils 10, 12 and the current in the coils 10, 12 are in the same direction it is only the duty cycle of current or amplitude that changes as necessary. In various embodiments, duty cycle and amplitude may be varied in different ways to achieve similar effects.

As media 2 falls through the working gap 9, a flow path 24 of media is established that flows down toward a flow sensor 19. A type of sensor 19 that works well may be an inductive sensor due as ferrous media may be used in magnetic valves 1, 2 like that of the present invention. However, other technologies that can be used include capacitive sensors, acoustic vibration, optical sensors, doppler, laser, time flight, bending beam proximity sensors, etc. The flow sensor 19 has an inductive coil 25 that is wound around a bobbin 26. The bobbin 26 has an upper funnel portion 28 that ensures the flow of media 3 is directed through the inner diameter 29 of the bobbin 26 in a smooth and unobstructed manner. The inductive coil 25 may include a magnetic shield 27 that shields the flow sensor from outside interference. Wires 30 connect the coil 25 to an oscillator that is not shown. The oscillator uses the inductive coil 25 and a capacitor not shown to generate an electrical signal with a frequency. As the media 3 flows through the inner diameter 29 of sensor 19 the frequency generated by the oscillator changes. The change of frequency by the oscillator is directly related to the flow rate of media 3.

During operation of the valve, a waveform of current, like that shown in FIG. 12, is applied to the coils 10, 12. This waveform of current has a duty cycle having an on time with amplitude 21 and an off time 22 corresponding to zero current. The duty cycle may be chosen to achieve a desired flow rate of media 3 through the working gap 9 of the valves 1, 2. This may be chosen from a lookup table that is specific to the valve 1, 2 being used. This lookup table may be populated by measuring the output of a specific valve (e.g., valve 1, 2) in a testing environment, and plotting/charting the output as a function of input signal. As such, a particular output (e.g., flow rate) is associated with an input signal. The duty cycle may also be a stored value remembered from a previous operation of the valve 1, 2 where the desired media flow was successfully achieved. The on time of the duty cycle of current is indicated at 32 on FIG. 12 and corresponds to the duty cycle of a pulse that may achieve the desired flow rate. The duty cycle of current 32 may be immediately applied once it is decided to initiate flow of media 3 through the valve. The timing of when to apply the duty cycle of current 32 is typically initiated slightly after flow of air is established below the valve, and that flow of air propels the media 3.

Figure 13:
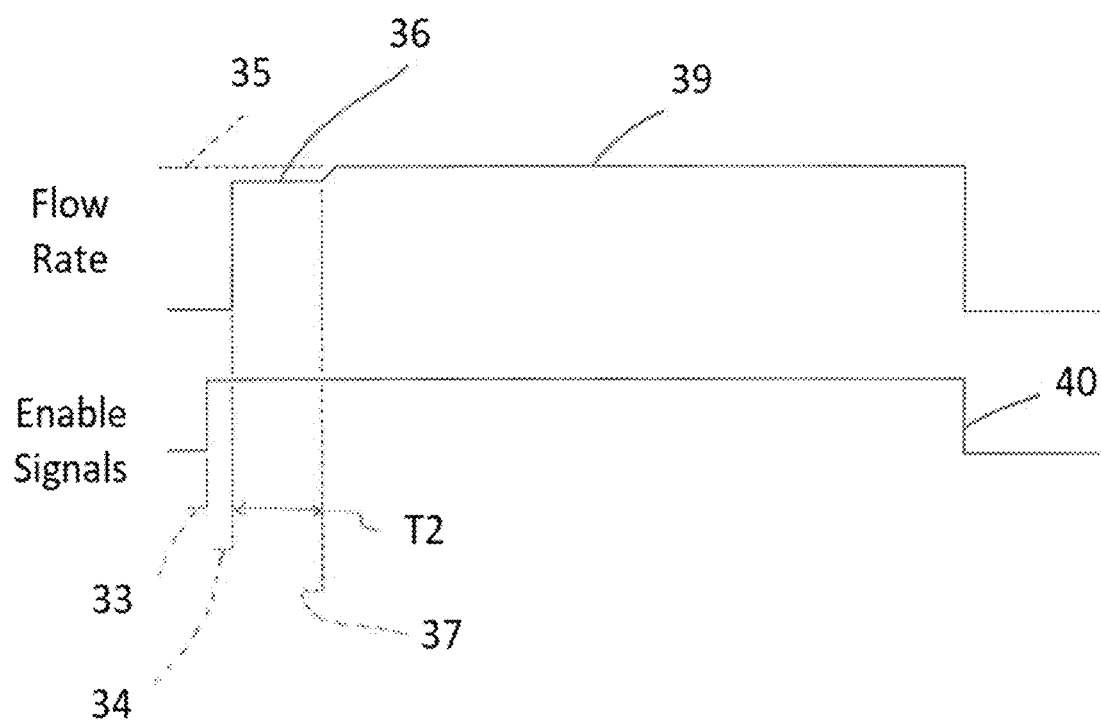
FIG. 13 shows time-based curves for enable signals and flow of media through the valve according to the various examples disclosed herein.

The timing of the valves 1, 2 is shown in FIG. 13. The upper curve in FIG. 13 is flow rate over time. The flow rate is measured in pounds per minute. The curves in FIG. 13 show the signals over time. On the lower curve, an enable signal 33 is initiated to begin the flow of air that carries the media 3 dispensed from the valves 1, 2. After the enable signal 33, and after a desired amount of time has expired, another enable signal 34 may be sent to a controller that initiates the first duty cycle of current 32 in the coils 10, 12. The first duty cycle of current 32 in the coils is chosen to correspond to a desired flow rate of media 3. The first duty cycle of current 32 may be chosen from a table that provides a prediction of the flow rate that will be achieved from applying a particular duty cycle of current at a predetermined amplitude of current. The enable signal 34 that initiates flow of the media is held for a predetermined time T2 that may allow enough time for the flow of media 3 to reach a steady state or stable level. This may also allow time for media 3 to reach the flow sensor 19. During this time, there may be no use of the flow sensor 19 to verify the flow rate of the media 3. It should be noted that even though a duty cycle of current as shown in FIG. 12 may be applied to the coils 10, 12, the flow during T2 as shown in FIG. 13 may be smooth.

The hold off time corresponding to T2 may be a time during which the flow of media 3 is open loop control without any verification of the flow that results from the application of the first duty cycle of current 32 in the coils 10, 12. In the example shown in FIG. 13, the flow rate during the predetermined time T2 indicated at 36 is slightly below the desired flow rate 35 shown in the upper curve. In practice, the flow rate during T2 may be fairly close to the desired flow rate because the first duty cycle of current 32 may be chosen with a reasonable approximation to what is necessary to achieve a desired flow rate. This flow rate indicated at 36 may be the actual flow rate that results from the application of the first duty cycle of current 32 in the coils 10, 12. At the end of the predetermined time T2, the sensor 19 may begin measuring the flow rate of media 3 resulting from applying the first duty cycle of current 32 to the valve. In the closed-loop control, the controller compares the actual flow rate 36 to the desired flow rate 35. If there is a difference between the desired flow rate 35 and the actual flow rate 36, the controller may assume control of providing the duty cycle, indicated at 37, to adjust the duty cycle of current 32 toward what is necessary to achieve the desired flow rate 35. In this case, the actual flow rate 36 may be lower than the desired flow rate 35 so the closed-loop control adjusts the flow rate higher. Once the value 39 is substantially equivalent to the desired flow rate 35, the value 39 is held at steady-state for the duration of the cycle, which is ended by a cancelled enable signal at time 40. Thus, the duty cycle of the current is changed to a second duty cycle of current indicated at 38 on FIG. 12, which corresponds with a wider pulse and a longer duty cycle that is necessary to achieve the desired flow rate.

At the enable signal 34 that initiates the flow of media 3, the valves 1, 2 initiate at (e.g., immediately jump to) a predetermined first duty cycle of current 32 that corresponds to the desired flow rate 35. This predetermined first duty cycle may be retrieved from a lookup table, or may be based on a formula with inputs related to the desired flow rate. This enables the valve to reach the desired flow rate 35 more quickly than other valves that ramp up to a particular flow rate from zero because the valve may be initiating at a value that causes flow closer to the desired flow rate. The quicker achievement of the desired flow rate comes from a near instantaneous application of the first duty cycle of current 32 instead of ramping up from a zero duty cycle then moving toward what is necessary. Once the valves 1, 2 have initiated at this predetermined value, the valves 1, 2 switch to a closed loop control system in order to automatically compensate for changes that affect flow rate by measuring the desired flow rate 35 directly. As such, the controller is switching from an open-loop control system (that receives and applies the predetermined duty cycle value) to a closed-loop control system (that self-corrects based on sensor output).

Changes in the overall environment that may affect the flow rate may be related to the media changing over time or other factors. In some cases, the media 3 may become slightly magnetized. This is particularly true of stainless-steel cut wire, and the current that may be necessary to achieve a particular flow rate may change. The valves 1, 2 may compensate by adjusting the current to the coils 10, 12 by using signals from the flow sensor 19 so that desired flow rate of media 3 is maintained after the predetermined time T2. Additionally, any new duty cycle of current necessary to achieve the desired flow rate 35 (second duty cycle of current 38) may be stored so that when the valves 1, 2 are started at a later time, they may jump to the appropriate duty cycle of current necessary to achieve the desired flow rate. The stored duty cycle of current may be the duty cycle of current that the valves 1, 2 were using to achieve the desired flow rate 35 at the time they were last used and when the valves 1, 2 were being operated in their steady state flow as indicated by 35 on the upper curve. This second duty cycle of current 38 may be higher as indicated in FIG. 12, or may also be lower. At the end of each use, a stop signal 40 may be sent to the valves 1, 2 and this halts the flow of media.

Figure 14:
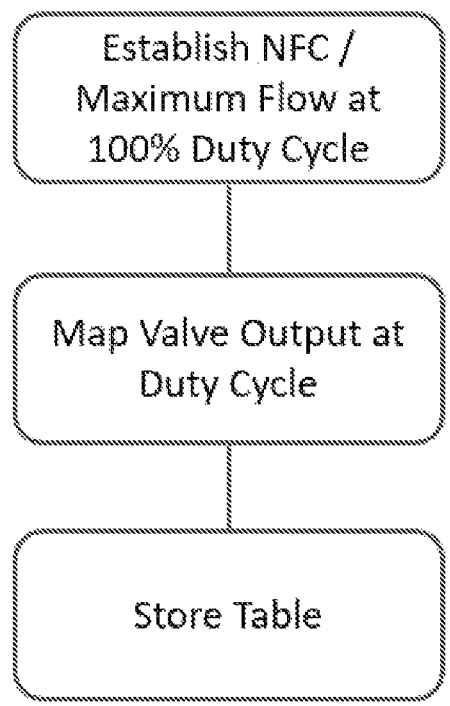
FIG. 14 is a flow chart for a method of populating an open-loop table according to the various examples disclosed herein.
Figure 15:
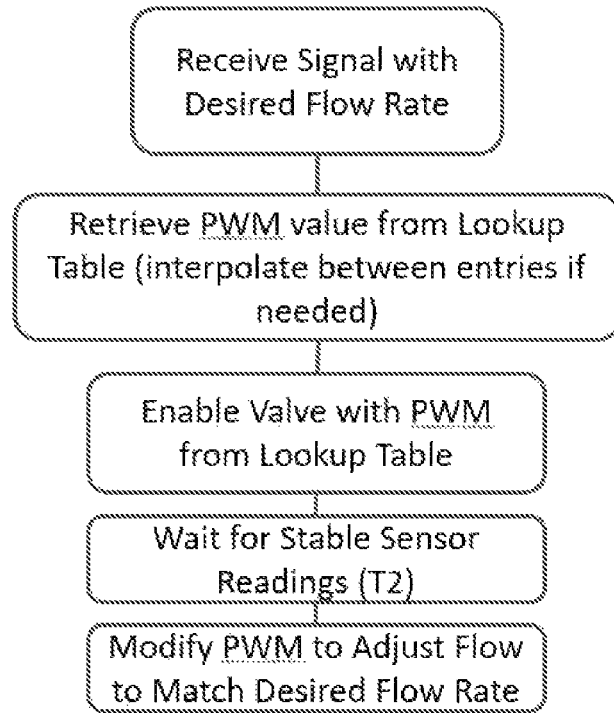
FIG. 15 is a flow chart for a method of starting a valve in a known open-loop flow rate and transitioning to closed-loop control according to the various examples disclosed herein.

FIG. 14 is a flowchart of a process for generating the table used for initial (open loop) flow rates. FIG. 15 is a flow chart for a method of starting a valve in a known open-loop flow rate and transitioning to closed-loop control. Before each valve 1, 2 can enter service, its flow must be mapped. The first step of that mapping may involve determining the maximum flow rate with a 1% duty cycle signal applied to the coils 10, 12. The voltage (or current) applied to the coils 10, 12 at 1% duty cycle, that results in maximum flow, is recorded. The maximum flow rate may be measured either with the flow sensor or "catch test." The voltage/current level may be fixed at the amplitude that results in the maximum flow and remains unchanged after that point. The flow rate may then be established and measured at reduced duty cycles of 95%, 85%, and so on until 15% duty cycle is reached. Each measured entry is then recorded in a lookup table for future reference. The number of entries in the lookup table are for example only and do not limit the scope of this disclosure. These flow rates are populated in the lookup table with their corresponding duty cycle.

Figure 17:
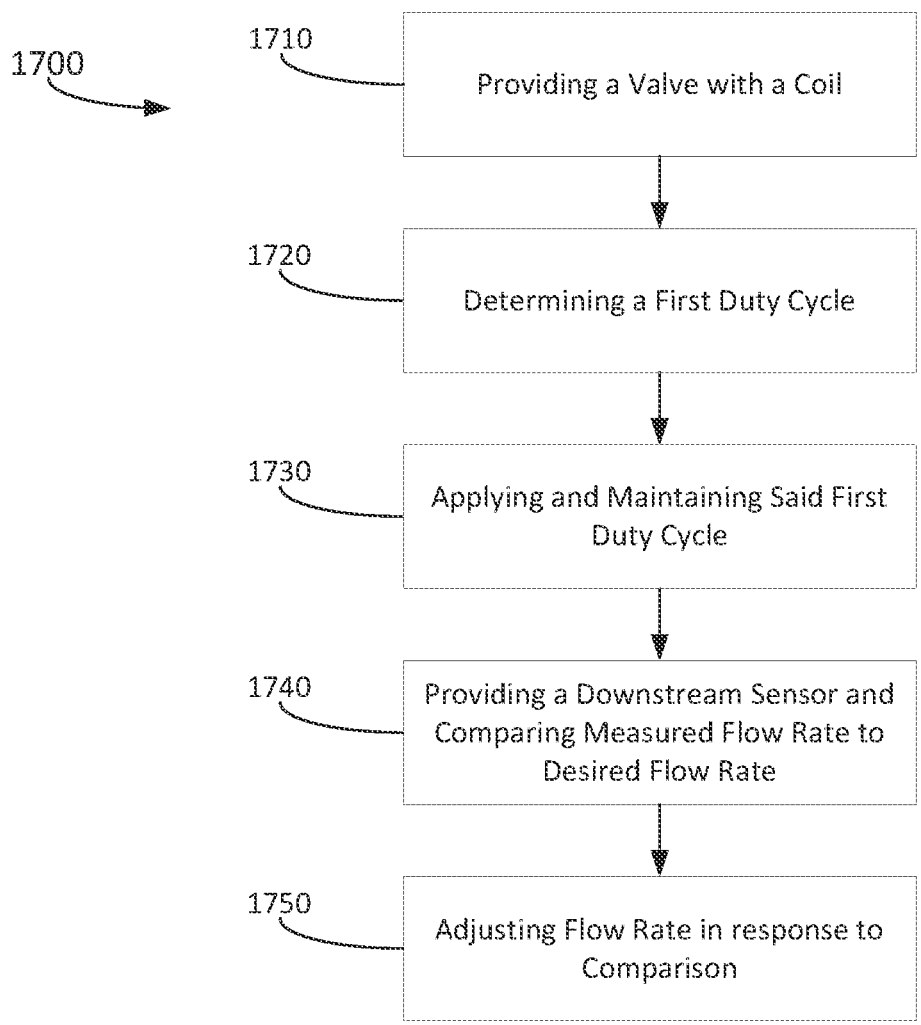
FIG. 17 is a flow chart illustrating an example method of using the valves to control shot peening media.

FIG. 17 is a flow chart illustrating an example method 1700 of using the valves 1, 2 to control shot peening media. The method 1700 includes, at block 1710, providing a valve (e.g., first valve 1, second valve 2) having a coil (e.g., coils 10, 12). From there, the method 1700 includes, at block 1720, determining a first duty cycle for the valve of 1710. This may include receiving a desired flow rate from the user. Upon receipt of that signal, the controller may refer to a lookup table (e.g., the lookup table described above) to establish the first duty cycle. If the exact entry is not found (e.g., there is not an entry in the lookup table for the desired flow rate), the controller may perform an interpolation between entries in the table and enables the output.

The method 1700 further includes, at block 1730, applying and maintaining the first duty cycle for an amount of time. Applying the duty cycle may include directing a certain amount of voltage (or current) to the coils 10, 12, such that the coils 10, 12 provide a magnetic field of a certain strength. Maintaining the duty cycle may then include holding the certain amount of voltage steady (or relatively steady), such that the provided magnetic field would be expected to remain similarly steady. At block 1740, the method 1700 further includes providing a sensor downstream of the flowing media and, after the amount of time (e.g., "T2" of FIG. 13) passes, the receiving a signal from the downstream sensor that corresponds to the flow rate. The T2 time may be determined based on the media type and the distance between the working gap 9 and the sensor 19. If the T2 time is too short, then the sensor 19 may not yet receive media, which may then cause the sensor to give erroneous readings and cause instability of the system. Once the downstream sensor is providing stable reading (e.g., after T2 expires), the method 1700 proceeds to block 1750 and adjusts the flow rate of media in a closed-loop feedback cycle based on the readings from the downstream sensor.

In one example, a method for quickly establishing controlled flow of media includes providing a valve having a first pole piece and a second pole piece separated by a working gap through which the media may flow, the pole pieces for directing a first magnetic field through the working gap; providing a coil to generate a second magnetic field when electrical current is passed through the coil, the second magnetic field opposing the first magnetic field; and determining a first duty cycle of current corresponding to a desired flow rate by referring to a predetermined lookup table. If the desired flow rate is not in the table, the method includes interpolating between entries in the predetermined lookup table to determine the first duty cycle of current. From there, the method includes applying the first duty cycle of current to the coil to establish a first flow rate of the media through the working gap; maintaining the first duty cycle of current for a predetermined time; providing a sensor downstream of the working gap for measuring the first flow rate of the media resulting from the first duty cycle of current in the coil after the predetermined time; comparing the first flow rate as measured by the sensor after the predetermined time to the desired flow rate, and adjusting the first duty cycle of current applied to achieve the desired flow rate when a difference exists between the first flow rate and the desired flow rate.

In some of these examples, the first duty cycle has a pulse width being altered in response to the comparison of the first flow rate and the desired flow rate. In further of these examples, the first and second pole pieces are angled with respect to each other. In some of these examples, the first and second pole pieces are connected to a first magnet for generating the first magnetic field, the first and second pole pieces are angled with respect to each other.

In some of these examples, the method further includes populating the predetermined lookup table by establishing maximum flow of the valve at 1% duty cycle; mapping a flow of the valve at discrete reduced duty cycles; and storing the flow of the valve at the discrete reduced duty cycles in the lookup table.

In some of these examples, the first duty cycle of current after being adjusted is a second duty cycle and the second duty cycle being stored. In further of these examples, the second duty cycle is used to initiate flow of the media when the valve is restarted after stopping flow of the media.

In some of these examples, the method further includes directing an overdriving amount of current to the coil to overdrive and reverse the second magnetic field.

In another example, a method for regulating the flow of media includes providing a first pole piece and a second pole piece extending through a pipe for guiding the media, the first and second pole pieces being separated by a working gap within the pipe through which the media may flow; connecting the first and second pole pieces to a permanent magnet providing a first magnetic field; determining a first duty cycle of current corresponding to a desired flow rate; providing a coil for generating a second magnetic field when electrical current is passed through the coil, the second magnetic field opposite to that of the first magnetic field; applying the first duty cycle of current to the coil to establish a first flow rate of the media through the working gap; maintaining the first duty cycle of current for a predetermined time; providing a flow rate sensor downstream of the working gap for measuring the first flow rate of the media resulting from the first duty cycle of current in the coil after the predetermined time; and comparing the first flow rate as measured by the sensor to the desired flow rate and adjusting the first duty cycle of current to achieve the desired flow rate when a difference exists between the first flow rate and the desired flow rate.

In some of these examples, the coil surrounds a portion of one of the pole pieces. In further of these examples, the first duty cycle has a pulse width being altered in response to the comparison of the first flow rate and the desired flow rate.

In some of these examples, the first and second pole pieces are angled with respect to each other. In some of these examples, the flow rate sensor includes an inductive coil circumscribing the media flowing therethrough. In some of these examples, the first duty cycle of current after being adjusted is a second duty cycle of current and the second duty cycle of current being stored. In further of these examples, the second duty cycle is used to initiate flow of the media when the valve is restarted after stopping flow of the media.

In some of these examples, the method further includes directing an overdriving amount of current to the coil to overdrive and reverse the second magnetic field.

In another example, a method for regulating the flow of media includes providing a first pole piece and a second pole piece extending through a pipe for guiding the media, the first and second pole pieces being separated by a working gap within the pipe through which the media may flow; connecting the first and second pole pieces to a permanent magnet providing a first magnetic field; providing a first coil surrounding a portion of the first pole piece and a second coil surrounding a portion of the second pole piece, the coils for generating a second magnetic field when electrical current is passed through the coils, the second magnetic field opposite to that of the first magnetic field; determining a first duty cycle of current corresponding to a desired flow of the media through the working gap; applying the first duty cycle of current to the coils to establish a first flow rate of the media through the working gap; maintaining the first duty cycle of current for a predetermined time; providing a sensor downstream of the working gap for measuring the first flow rate of the media resulting from the first duty cycle of current in the coils after the predetermined time; measuring the first flow rate after the predetermined time; and comparing the first flow rate as measured by the sensor to the desired flow rate and adjusting the first duty cycle of current to achieve the desired flow rate when a difference exists between the first flow rate and the desired flow rate.

In some of these examples, the first duty cycle has a pulse width being altered in response to the comparison of the first flow rate and the desired flow rate in some of these examples, the flow rate sensor includes an inductive coil circumscribing media flowing therethrough. In some of these examples, the first duty cycle of current after being adjusted is a second duty cycle of current and the second duty cycle of current being stored. In some of these examples, the method further includes directing an overdriving amount of current to the coil to overdrive and reverse the second magnetic field.

As such, methods, systems, apparatuses, and non-transitory computer readable media having instructions stored thereon are described herein for adjusting a flow rate of media during shot-peening using a combination of open-loop and closed-loop control systems, methods, systems, apparatuses, and non-transitory computer readable media having instructions stored thereon are further described herein for adjusting the neutral field current of the valve, wherein a step-wise method may be used to calibrate a valve in the field using the full flow signal provided by the flow sensor. The non-transitory computer readable media having instructions stored thereon may be configured such that, upon execution of the instructions by a processor of a computing device, the computing device and/or processor may perform any of the operations, methods, and/or flow chart aspects described herein.

The invention is not limited to the details above, but may be modified within the scope of the following claims.

What is claimed is:

1. A method for quickly establishing controlled flow of a media comprising:
   providing a valve having a first pole piece and a second pole piece separated by a working gap through which the media may flow, the first pole piece and the second pole piece for directing a first magnetic field through the working gap, wherein the first pole piece is directly connected to a first magnet and the second pole piece is directly connected to a second magnet for generating the first magnetic field;
   providing a coil to generate a second magnetic field when electrical current is passed through the coil, the second magnetic field opposing the first magnetic field;
   determining a first duty cycle of current corresponding to a desired flow rate by referring to a predetermined lookup table;
      when the desired flow rate is not in the predetermined lookup table:
         interpolating between entries in the predetermined lookup table to determine the first duty cycle of current; and
      when the desired flow rate is in the predetermined lookup table:
         determining the first duty cycle of current by retrieving the first duty cycle of current from the corresponding desired flow rate in the lookup table;
   applying the first duty cycle of current to the coil to establish a first flow rate of the media through the working gap;
   maintaining the first duty cycle of current for a predetermined time;
   providing a sensor downstream of the working gap for measuring the first flow rate of the media resulting from the first duty cycle of current in the coil after the predetermined time;
   comparing the first flow rate as measured by the sensor after the predetermined time to the desired flow rate to determine a difference between the first flow rate and the desired flow rate; and
   adjusting the first duty cycle of current based on the difference, wherein the adjusted first duty cycle of current achieves the desired flow rate, and storing the adjusted first duty cycle of current in the lookup table.

2. The method of claim 1, wherein the first duty cycle has a pulse width, and the pulse width being altered in response to the comparison of the first flow rate and the desired flow rate.

3. The method of claim 2, wherein the first pole piece and the second pole piece are angled with respect to each other.

4. The method of claim 1, wherein the first pole piece and the second pole piece are angled with respect to each other.

5. The method of claim 1, further comprising populating the predetermined lookup table comprising:
   establishing maximum flow of the valve at 1% duty cycle;
   mapping a flow of the valve at discrete reduced duty cycles, wherein the discrete reduced duty cycles are a predetermined interval apart from each other; and
   storing the flow of the valve at the discrete reduced duty cycles in the lookup table.

6. The method of claim 1, wherein the first duty cycle of current after being adjusted is a second duty cycle and the second duty cycle being stored.

7. The method of claim 6, wherein the second duty cycle is used to initiate flow of the media when the valve is restarted after stopping flow of the media.

8. The method of claim 1, further comprising directing an overdriving amount of current to the coil to overdrive and reverse the second magnetic field.

\* \* \* \* \*